April 12, 1932.   A. J. GINSBERG   1,854,132
COMBINATION FOCUSING AND EXPOSURE DEVICE
Original Filed April 5, 1928
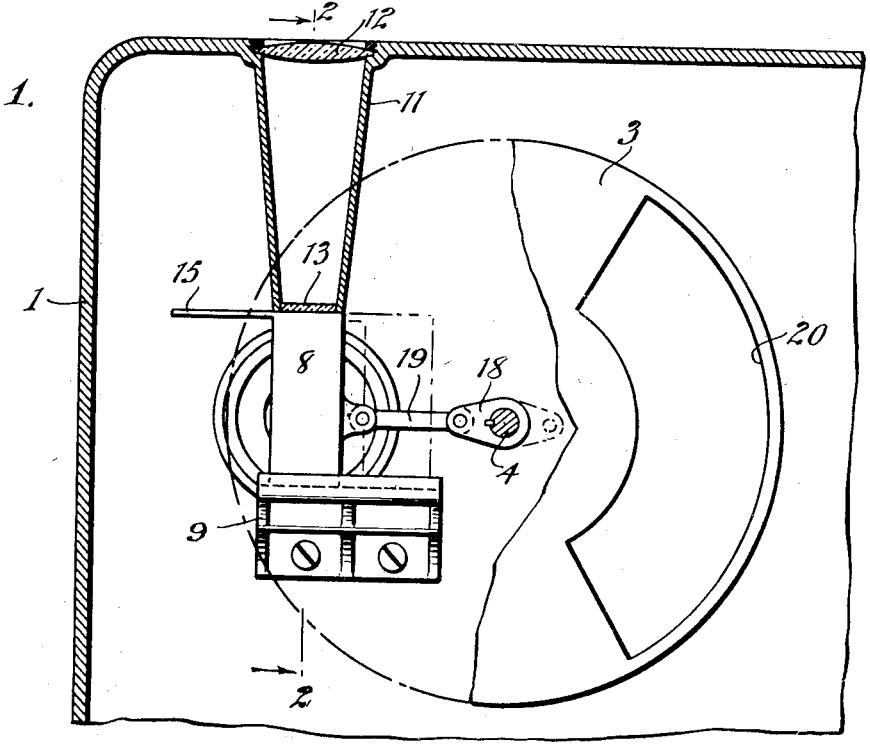
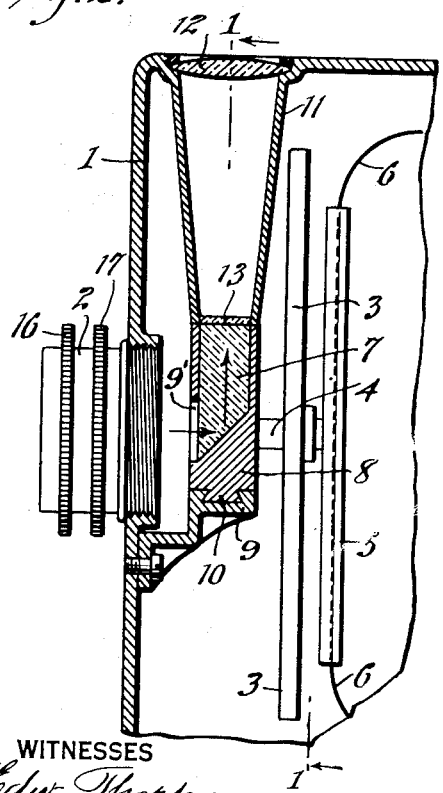
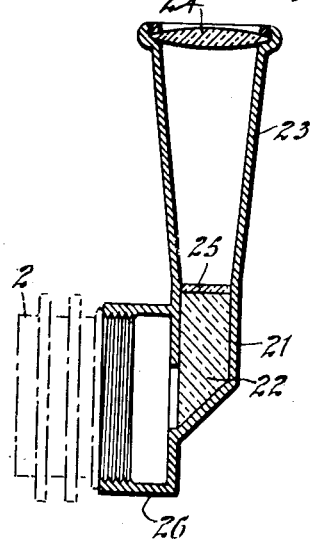
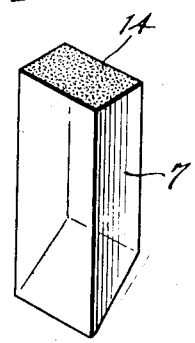
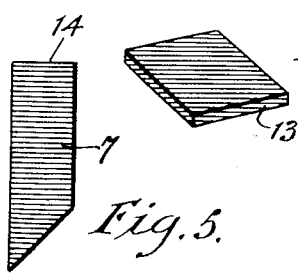
WITNESSES
Edw. Thorpe
S. W. Foster
INVENTOR
A. J. Ginsberg
BY
ATTORNEY Patented Apr. 12, 1932

1,854,132

UNITED STATES PATENT OFFICE

ABRAHAM J. GINSBERG, OF NEW YORK, N. Y.

COMBINATION FOCUSING AND EXPOSURE DEVICE

Application filed April 5, 1928, Serial No. 267,709. Renewed November 24, 1931.

This invention relates to a combined exposure-setting and focusing device adapted to be used in connection with photographic cameras. The particular type of camera with which my improved device may be most advantageously used is that constructed for use by amateurs. In the conventional type of amateur motion-picture cameras heretofore in use, no focusing plate or other surface is provided for receiving the image of the object to be photographed so that the operator is often compelled to use a separate device for accurately determining the distance of the object from the camera in order that the resulting picture may be in proper focus. Nor, in so far as I am aware, has any exposure-meter been devised to enable the operator to set the diaphragm stop directly to the proper opening for a given light condition without the use of tables, or more or less intricate calculations; nor has any instrument previously known been usable both for focusing and obtaining the proper exposure.

My invention contemplates the provision of a device by means of which the diaphragm stop of a lens unit may be set directly to the proper opening for any light condition and for enabling the direct setting of the camera lens unit in focus for objects at any distance, the exposure setting device and the focusing device being combined and containing common cooperating elements. The means common to both devices consists of suitable elements projecting the image of objects in the field of a given lens and for rendering the image visible right side up or in upright position.

My invention further contemplates the provision of a combined exposure setting and focusing device which may be used entirely apart from the camera, in connection with a camera lens, or which may be built into the camera. When made as a separate device, it may be suitably threaded to receive the camera lens detachably as a unit, whereby the lens, after being set by proper manipulation, may be removed bodily from the device without disturbing its setting and reinserted into the camera.

The various objects of my invention will appear from the description which follows and from the drawings.

In the accompanying drawings—

Figure 1 is a fragmentary view in transverse section through a motion picture camera, showing my improved device in operative position for focusing;

Figure 2 is a view in section on the line 2—2 of Figure 1;

Figure 3 is a perspective view of my improved prism;

Figure 4 is a perspective view of the colored glass plate, which is shown in Figures 1 and 2, to give the desired tone value;

Figure 5 is a view in elevation of a prism showing the same in color as a modification of a clear glass prism;

Figure 6 is a view in longitudinal section showing my improved focusing and exposure device as a part entirely independent of the camera but which is adapted to receive the lens barrel of the camera for focusing and then permit the lens barrel to be returned to the camera with the lens in proper focusing position.

Many camera operators carry an extra lens which they use for determining the proper focal setting for the camera lens. Where such an extra camera lens is available, the lens may be permanently or removably secured in my improved device as illustrated in Fig. 6, and after the proper setting for distance and exposure has been determined by my improved device, with the aid of the extra lens, the camera lens may be similarly set with assurance that the pictures will be in focus and properly exposed.

As has been explained, my improved device may be made part of the camera and permanently affixed thereto, or may be made as a separate device adapted to receive a lens corresponding to the camera lens, or to receive the camera lens itself. In the latter case, the lens is set directly for focus and stop after insertion into my device and then removed from the device while the setting is maintained, and reinserted into the camera.

In that embodiment of my invention wherein the device is made part of the camera, the camera casing 1 carries the lens barrel 2 which barrel is preferably removably secured thereinto as by means of suitable screw threads. A rotary shutter 3, of the usual type for intermittently exposing the film, is secured to the shaft 4, which is operated in any approved manner, while the guide 5, arranged outwardly of the shutter 3, serves to guide the film 6 during its movement.

These parts constitute standard equipment and serve to illustrate the position and operation of my improved attachment although of course it is to be understood that I do not limit my invention to any particular structure of motion picture camera as my invention can, with a slight modification, be adapted for any type of motion picture camera.

A feature of my invention is the provision of a surface on which the image of the object to be photographed, is projected in upright position, so that even when my device is used as an exposure-meter, the image can be seen. A suitable magnifying lens is provided to render the image easily visible, and suitable means are employed to tint the image, whereby the visible focused or unfocused image of the object may be tinted in various intensities by variation of the size of the stop.

In order to render the image of objects in the field of the camera lens visible, I prefer to project the light from the lens on to a ground glass surface by suitable reflecting means which may consist of a suitable prism or mirror. As illustrated in Figure 2, between the shutter 3 and the lens barrel 2 I locate a prism 7 which is supported in a suitable casing 8 having an opening 9' therein at the front of the casing exposing the lower front face of the prism.

The casing 8 is mounted to move transversely of the camera and I have illustrated as a means for supporting and permitting this movement a dovetailed track 9. In this dovetailed track 9 a dovetailed flange 10 on the lower end of the prism casing 8 is adapted to slide.

Above the prism casing 8 a sight tube 11 is secured to the casing 1, and has a magnifying lens 12 at its upper end, preferably located at the upper wall of the camera casing, as illustrated. The lower end of this sight tube 11 is closed by a glass plate 13, which may be blue in color or may be of any other suitable color so as to give the desired tone value.

The upper end of the prism 7 is ground, as shown at 14, and fits directly under glass 13, and the prism casing 8 at its upper end carries a horizontally positioned opaque shutter 15 which closes the end of the sight tube and prevents any entrance of light into the camera when the prism is moved out of alinement with the sight tube.

Instead of providing a colored glass 13 at the lower end of the sight tube, I may make the prism 7 of colored glass, as indicated in Figure 5, to give the described tone value.

If the glass plate 13 is used, the under face thereof may be ground instead of the upper face of the prism whereby the requisite surface is provided in either case for making the image visible through the lens 12. It will be seen that by adjusting or changing the stop in the barrel 2, the image can be tinted to a depth, such that the details just disappear from the shadows. The stop which so tints the image is the correct one to be used for the given light condition.

The lens barrel 2 above referred to is provided with two adjusting rings 16 and 17, respectively, the former adjusting the stop or diaphragm and the latter the focusing ring with which cameras of this type are provided, and while I make no claim to the particular construction of lens barrel and the diaphragm and focusing adjusting means I do claim such means broadly in combination with my reflex attachment as it is through the medium of this combination of parts that I am enabled to give the best results.

The barrel 2 may have a scale thereon for reading in connection with the diaphragm adjusting ring 16, and other means may be employed whereby a fine adjustment and proper reading may be had for time exposure in accordance with conditions.

In the form of my invention illustrated in Figure 6, I show a device which is entirely independent of the camera but which is adapted to receive the lens barrel of the camera and permit the proper positioning of the objects in the barrel while attached to my improved focusing device.

The construction of the separate device is in all essentials like that above described in connection with the camera, as it includes a casing 21 supporting a prism 22 with a sight tube 23 above the prism and supporting a magnifying lens 24. A colored glass 25 is located on top of the prism 22 and an internally screw-threaded extension 26 is provided on the casing 21 having the same sized opening or bore as the opening or bore in the camera for receiving the lens barrel 2.

This device functions precisely as the device above described with the exception of course that in using the same the lens barrel 2 is removably attached, the focusing and adjustments completed, and then the lens barrel is returned to the camera and the latter is ready for use.

Figure 1 illustrates the normal position of the parts in focusing with the prism 7 in line with the camera lens. The operator looks through the magnifying glass 12 at the ground end of prism 7 and adjusts the rings 16 and 17 until the object is properly focused as observed by viewing the image on the upper end of the prism or on the lower face of the plate 13, and the image is tinted until the details just disappear from the shadows.

It is of course to be understood that the distance between the lens and the upper end of the prism measured through a right angle is precisely the same as the distance between the lens and the film on a straight line so that when the lens diaphragm or stop is set and the lens focused by means of my improved device, the setting or focusing will be identical with that required for use in the camera.

The colored glass plate 13 gives the desired tone value, which of course may be obtained by making the prism itself in color, as shown in Figure 5, or in other words, the transparent colored member tints the image in cooperation with the lens diaphragm or stop in the manner above described whereby the correct stop may be easily and quickly determined, it being understood that the smaller the stop opening, the less light is admitted and consequently, the darker the image will be.

Suitable means are provided to move the prism out of its focusing position during the exposure of the film, as for instance, when my improved device is built into a camera, and it is desirable that this movement of the prism be automatic so that there can be no possibility of mistake on the part of the operator.

This movement of the prism may of course be made in many different ways. I have illustrated in Figure 1 a means which will answer the purpose. I show a crank arm 18 keyed to the shaft 4 and pivotally connected by a link 19 with the prism casing 8, so that as the shaft 4 is revolved the prism will be moved out of the path of the film when the shutter opening 20 exposes the film, and into focusing position when the opaque part of the shutter is between the lens and the film. As the prism moves away from focusing position the opaque cover or shutter 15 closes the lower end of the sight tube 11 so that no light can enter the camera.

Hence, I provide a motion picture camera with an attachment or a fixed part thereof which renders the camera a reflex camera and which is automatic in its change of position from focusing position to a position out of the way of the exposure of the film so that the operation or position of the prism is automatic and the operator can view the object during the operation of the motion picture camera as the movement is too rapid to be detected by the eye.

The exposure is determined in the following simple manner: The color screen 13 or 25, as the case may be, is of an intensity just sufficient to permit the visibility of the details in the shadows under the poorest photographic light conditions, when an F 1.5 lens is used wide open. Under more favorable light conditions the diaphragm may have to be stopped down until the details in the shadows are barely visible thus determining the correct stop directly.

My improved exposure meter and focusing device shown in Figure 6 functions in the following manner:

The device is built in proportion to match any motion picture camera, and the distance between the opening in the same for the reception of the lens barrel taken through a right angle due to the prism coincides with the distance between a similar opening in the camera and the film plane measuring in a straight line.

By unscrewing the lens barrel from the camera and screwing the same into my improved device, the operator can set the lens in exact focus and determine the proper stop to use for the proper exposure. The lens barrel is then unscrewed from the device and screwed into the camera, and the latter can be used with positive assurance that the lens is in focus and that the exposure will be correct.

My improved device and attachment has many advantages over existing devices, some of which may be enumerated as follows:

There are no scales to read, no calculations to be made, and the operation is extremely simple, that is, turning the lens diaphragm to the proper position and leaving it there, in combination with the ability to focus the lens exactly and under the vision of the eye. Furthermore, the device makes a most useful accessory for motion picture cameras.

It is primarily this structure broadly combining a direct exposure setting device with a focusing device that I desire to cover by a patent as it is clearly within the scope of the invention to modify the mechanical means for controlling the operation and positioning of the prism, and other changes might be made in the general form of the parts described without departing from my invention, and hence I do not limit myself to the precise details set forth but consider myself at liberty to make such alterations and changes as fairly fall within the spirit and scope of the appended claims.

I claim:

1. The combination with a motion picture camera, of a sight tube in the camera, a magnifying lens at the outer end of the sight tube, a supporting guide below the sight tube, a prism casing having a prism therein normally positioned between the sight tube and the support, a shutter on the upper end of the prism casing to shut the inner end of the sight tube when the prism is moved laterally, and means for continuously reciprocating said prism casing laterally during the operation of the camera.

2. The combination with a motion picture camera, of a sight tube in the camera, a magnifying lens at the outer end of the sight tube, a supporting guide below the sight tube, a prism casing having a prism therein normally positioned between the sight tube and the support, a shutter on the upper end of the prism casing adapted to shut the inner end of the sight tube when the prism is moved laterally, means for continuously reciprocating said prism casing laterally during the operation of the camera, and a colored glass at the lower end of the sight tube.

3. In a device of the character described, a casing having provision adapted to detachably receive a lens, a reflecting prism in said casing adapted to cast the image of objects in the field of the lens on one of its faces in upright position, an upstanding sight tube above the prism, a magnifying lens in said tube for magnifying the image, and a transparent colored member interposed between the magnifying lens and the prism.

Signed at New York, in the county of New York and State of New York, this 3 day of April, A. D. 1928.

ABRAHAM J. GINSBERG.